April 14, 1925.

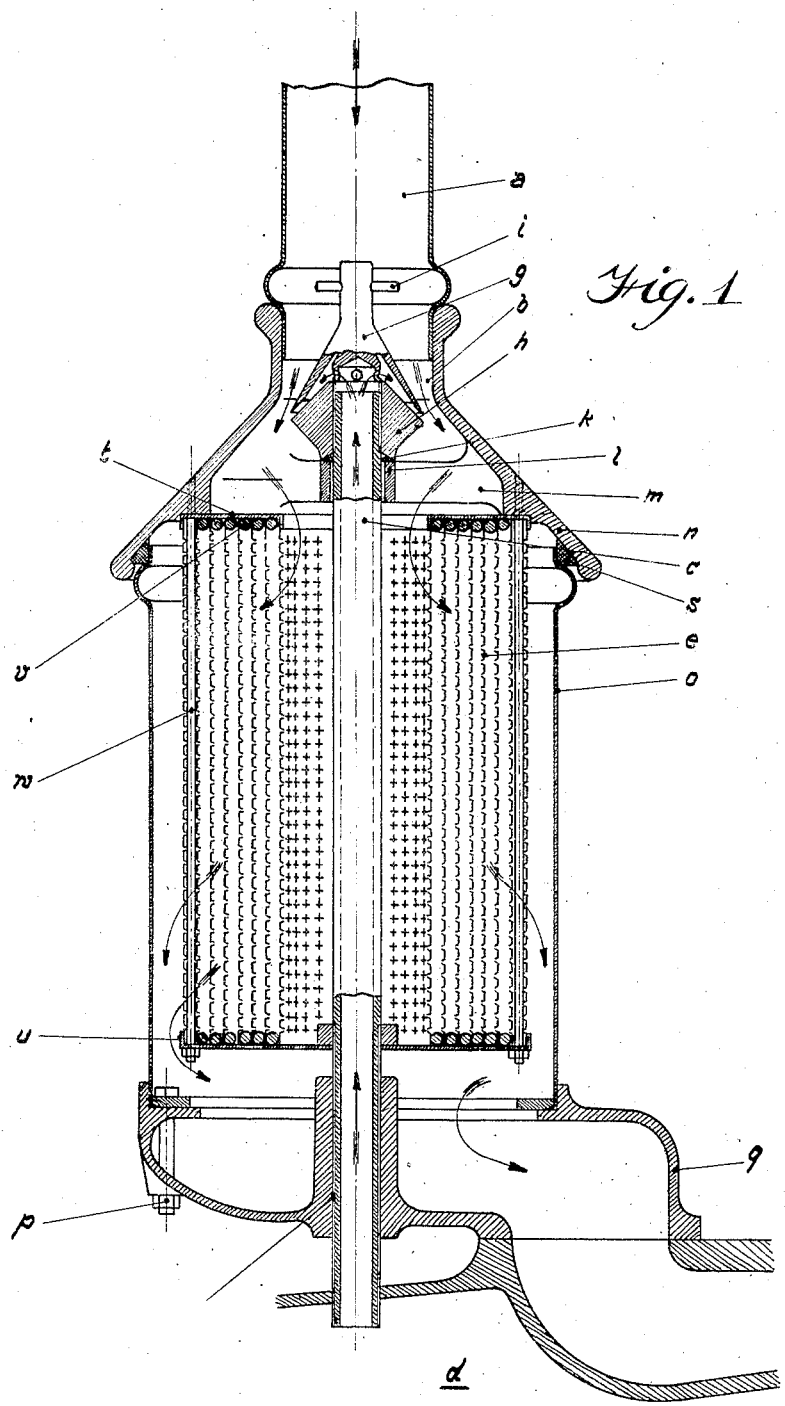

K. SCHROEDER 1,533,813

APPARATUS FOR SEPARATING AND BINDING DUST OR OTHER
IMPURITIES IN COMBUSTION AIR OF COMBUSTION ENGINES

Filed March 30, 1921. 2 Sheets-Sheet 2

Patented Apr. 14, 1925.

1,533,813

UNITED STATES PATENT OFFICE.

KARL SCHROEDER, OF DUSSELDORF, GERMANY, ASSIGNOR TO THE FIRM HEINRICH LANZ, OF MANNHEIM, GERMANY.

APPARATUS FOR SEPARATING AND BINDING DUST OR OTHER IMPURITIES IN COMBUSTION AIR OF COMBUSTION ENGINES.

Application filed March 30, 1921. Serial No. 456,965.

*To all whom it may concern:*

Be it known that I, KARL SCHROEDER, a citizen of the Republic of Germany, residing at Dusseldorf, Germany, have invented certain new and useful Improvements in an apparatus for separating and binding dust or other impurities in combustion air of combustion engines, of which the following is a specification.

This invention relates to a novel method of an apparatus for the separating and binding of dust or other impurities contained in the air, which as combustion air, in combustion engines is sucked-up for the formation of the explosive mixture.

The first feature of this invention consists in the use of oil for the binding of the dust particles and other impurities of the air. According to my invention however, such oil vapours are used as are sucked-up from the motor crank case to the apparatus, and which are mixing with the air in the interior of the apparatus.

The separating and binding of the dust by means of such oil vapours as are sucked-up from the motor crank case, for instance by an injector device, is accomplished in such a manner as to cause the air of the motor crank case, which is to be purified from dust and other impurities, closely to mix with the sucked-up oil-vapours, binding thus by means of the oil particles the particles of dust and other impurities contained in the air.

The second feature of this invention lays in the fact that the mixture consisting of oil vapours and air, is on its further way forced against obstacles or impact surfaces, on which both the said oil particles and the dust particles are deposited and collected.

Said obstacles or impact surfaces are formed by concentric cylinders, the walls of which are perforated, while the edges of the perforation holes are projecting to the interior of the apparatus, thus in an opposite direction to the air current. By this arrangement eddies are formed in the mixture whereby the oil containing the impurities is deposited and retained.

The intimate mixture of the air with the oil vapours, and furthermore the strong binding by the oil of the dust particles and other impurities is, according to my invention, attained by sucking-up the oil vapours with the inductional current by means of suction or injection pressure. Moreover, the desired end is attained by forcing the mixture against the impact surfaces.

The close and intimate mixture is thus achieved: Firstly by the fact that the oil is sucked-up with the inductional current by injector pressure; and secondly by the action of the impact surfaces.

Figure 1 represents a vertical section of an apparatus for separating and binding dust in the combustion air of combustion engines and by means of which my novel method can be carried out in practice. Figure 2 represents, in sectional elevation, an internal combustion engine in conjunction with which an apparatus embodying my invention is employed.

The air required for the formation of the mixture is introduced by the suction pipe *a*, passes on its way to the cylinders or carburettors through the injector *b*. Into said injector *b* opens the pipe *c* which leads to the motor crank case *d*. The oil vapours of the crank case are sucked-up by the injector and are caused to mix with the air. This mixture is now forced against the impact surfaces *e* which, according to this invention, consists of a suitable number of plates placed around each other in the manner of the known grater plates. On account of the particular form of said plates (being especially characterized by the fact that the edges of the perforation holes are turned forwardly, i. e., in opposite direction to the air current) is caused in front of and between said plates a strong movement of eddies and thereby obtained an intense bumping and backstroke motion of the air, i. e., of the dust and oil particles, thus closely binding the dust particles by means of the oil particles, while, on the other hand, the oil particles have sufficient opportunity to collect on the impact surfaces.

The construction of the combined filter and injector is performed as follows:

The cap *g*, together with the core *h* forming the injector *b*, and at its upper end being provided with the handle *i*, is screwed on to the pipe *c* and may be welded together with the latter at *k*. The pipe *c* is inserted through the guides *l* forming a part of the turnstile *m* of the cover *n* and further inserted into the casing *o*, which by means of the bolt $p$ is mounted to the suction pipe $q$. With the turning of the handle $i$ the cover $n$ is fastened to the casing $o$ by means of the thread $r$ and tightened by the packing ring $s$. The suction pipe $a$ is now inserted into the opening provided in the cover $n$. The filter consists of two plates $t$ and $u$ between which plates are arranged the cylindrical grater plates. The filter plates $e$ are held in their position by the distance rings $v$, while the filter is screwed to the cover $n$ by means of the bolts $w$.

In Figure 2, I have shown the apparatus for binding dust in assembled relationship with respect to an internal combustion engine of a conventional type, it being understood that the type of engine employed is immaterial. The casing $o$ has connected with it a suction pipe $q$ leading to the carburetor 1 and which leads to the valve controlled inlet 3 of the casing. The suction pipe $c$ communicates with the crank case 2. 4 designates the engine cylinder, 5 the piston, and 6 the connecting rod. The apparatus is arranged behind the plane of section of the cylinder 4. The crank case on the left of the connecting rod 6 is shown in a section lying behind the drawn plane of section of the cylinder 4 for the purpose of showing a part of the suction pipe $q$ also in section. Besides the pipe $q$ is drawn out (on the right side of the connecting rod) from which it is to be seen that for purpose of illustration only, the pipe $q$ is going through the crank case.

What I claim as my invention and desire to secure by Letters Patent is:—

1. Apparatus of the character stated, comprising means for mixing oil vapors with atmospheric air, a separator consisting of a plurality of spaced, concentrically arranged, perforated, impact plates, and means for causing said mixture to progressively impinge against said plates to cause binding of dust particles with oil particles, the latter being caused to adhere to the surfaces of said impact plates.

2. Apparatus of the character stated, comprising a separator consisting of a plurality of concentrically arranged, spaced and perforated impact plates, piped means for conveying oil vapors through the central chamber of said separator, means for mixing said vapor with atmospheric air beyond said separator, and means for causing said mixture to pass to the central chamber of said separator and to thereafter progressively impinge against said impact plates to cause binding of dust particles with oil particles, the latter being caused to adhere to the surfaces of said impact plates.

3. Apparatus of the character stated, comprising a separator consisting of a plurality of concentrically arranged, spaced and perforated impact plates to provide a central chamber open top and bottom and a plurality of annular chambers closed top and bottom, piped means for conveying oil vapors through the central chamber of said separator, means for mixing said vapor with atmospheric air beyond said separator, and means for causing said mixture to pass to the central chamber of said separator and to thereafter progressively impinge against said impact plates to cause binding of dust particles with oil particles, the latter being caused to adhere to the surfaces of said impact plates.

In testimony whereof I affix my signature in presence of two witnesses.

KARL SCHROEDER.

Witnesses:
  CARL ROSIER,
  PAUL ESSER.